United States Patent [19]
Vicendese et al.

[11] 3,945,176
[45] Mar. 23, 1976

[54] COMBINATION POWER DRIVEN LAWN-MOWER AERATOR

[76] Inventors: Anthony P. Vicendese, 50 Sutton Drive; Frank Vicendese, 617 Plainfield Ave., both of Berkeley Heights, N.J. 07922

[22] Filed: Sept. 16, 1974

[21] Appl. No.: 506,347

[52] U.S. Cl. .................. 56/11.8; 56/16.9; 56/17.4; 56/320.2
[51] Int. Cl.² ......................................... A01D 43/02
[58] Field of Search .......... 56/16.1, 13.5, 11.8, 202, 56/255, 249, 16.9, 320.2, 17.4

[56] References Cited
UNITED STATES PATENTS

| | | | |
|---|---|---|---|
| 2,275,360 | 3/1942 | Gargiule et al. | 56/249 |
| 2,722,795 | 11/1955 | Warner | 56/249 |
| 2,909,021 | 10/1959 | McLane | 56/16.9 |
| 2,984,961 | 5/1961 | Judkins | 56/13.5 X |
| 3,102,375 | 9/1963 | Troka et al. | 56/249 X |
| 3,205,643 | 9/1965 | Dunham | 56/249 X |
| 3,802,170 | 4/1974 | Seifert et al. | 56/11.8 |
| 3,872,656 | 3/1975 | Dahl | 56/320.2 |

*Primary Examiner*—Louis G. Mancene
*Assistant Examiner*—J. N. Eskovitz
*Attorney, Agent, or Firm*—Howard R. Popper

[57] ABSTRACT

A power driven rotary lawn mower is disclosed in which an auxiliary power drive is provided for engageably coupling engine power to a tine-bearing shaft located between the front drive wheels. The tine-bearing shaft is supported between arms that can be raised and lowered from a linkage controllable at the handle. The combination permits thatching, grass cutting and mulching at the same time and may be used in combination with a rearwardly mounted seed-drill for immediately reseeding of a thatched lawn.

5 Claims, 5 Drawing Figures

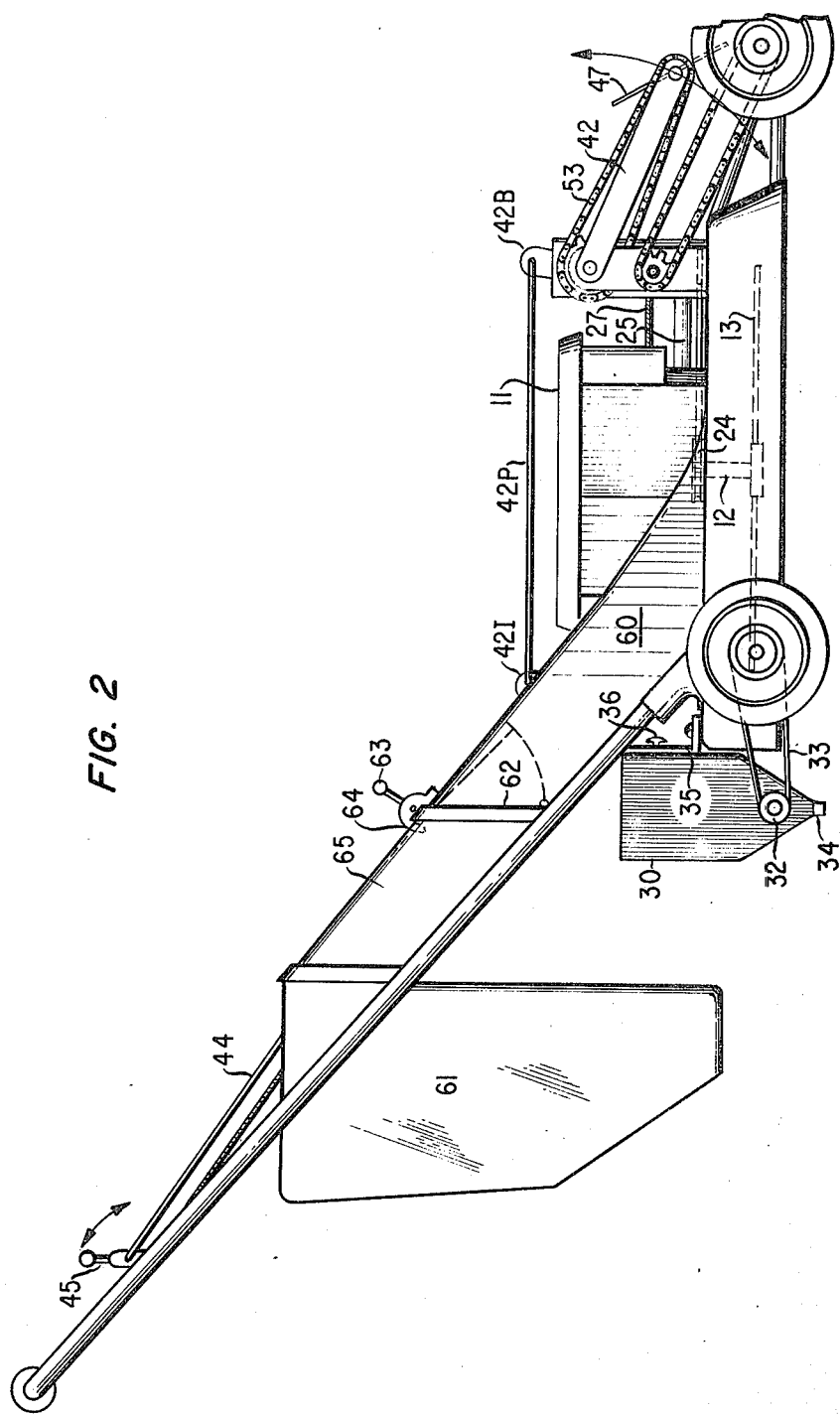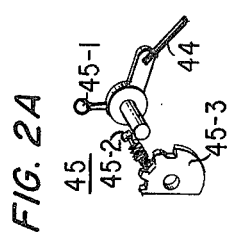

COMBINATION POWER DRIVEN LAWN-MOWER AERATOR

BACKGROUND OF THE INVENTION

This invention relates to power-driven lawn care equipment and more particularly to equipment of the lawnmower type.

In our copending application, Ser. No. 477,595, filed June 10, 1974, we have disclosed a combination power-driven lawn mower and lawn care chemical dispensing machine. This machine was devised to simplify lawn care by combining the conventional lawn cutting operation with that of applying lawn care chemicals; two tasks that theretofore had to be performed separately. That invention in one of its aspects involved the affixing of a chemical dispensing hopper to the main frame of the mower and powering the chemical distributing vanes from the mower either by pulley or by engagement with one of the mower wheels.

While chemical dispensing was thereby enabled to be performed simultaneously with lawn cutting, there are other lawn tasks such as thatching which up to now have had to be performed separately.

When thatching is performed by a unifunctional prior art thatching machine, the tines operate at a rotational speed which is considerably lower than that of the whirling blade of a rotary mower. The tine peripheral speed is also lower than that of the wheels of the thatcher which are pushed or driven across the lawn. The result of the thatching operation is to separate the dead grass or thatch from the live, growing grass thereby to permit sunlight and air to reach closer to the base of the grass plant. Because the tines of an aerator operate at a slow peripheral speed, the thatch is loosened and lifted in the conventional machine but is not thrown with the force that cut grass clippings are discharged by a rotary mower blade. Accordingly, the user of a conventional thatching machine is forced, after the thatching operation, to go over the lawn again in order to sweep or rake up the loosened debris. It would be extremely desirable, therefore, to provide a machine that could reduce or even eliminate the need for a separate raking operation.

The conventional power-driven rotary lawn mower consists of a four-wheel carriage supporting a gasoline engine above a main platform and a rotary blade mounted on the engine shaft below the platform. The engine shaft is vertical and the grass-cutting blade rotates in a horizontal plane. At one point adjacent the periphery of the blade's rotation, the main platform is formed into an ejection chute or tunnel for discharging the cut grass clippings. In more recent models of the rotary lawn mower, the ejection chute is articulated rearwardly of the motor shaft and is designed to dispense the grass clippings into a grass catcher or bag that may be suspended between the control handles. This has the advantage of permitting the mower to be maneuvered amongst shrubs and trees without requiring any more maneuvering room than the axle width of the mower housing.

Another of the convenience options available to purchasers of rotary lawn mowers is the mower that is equipped with power drive wheels. In this type of mower, a power take-off in the form of a belt or chain drive is coupled to the main motor shaft and, via a right-angle drive, is also coupled to the front wheel axle so that the engine power in addition to driving the cutting blade also drives the front wheels thereby reducing the pushing effort of the operator to that of a steering or guidance effort.

Because only a fraction of the total available horsepower of the mower is needed to be employed in propelling the front wheels and because the right-angle drive heretofore used has proven practical in transmitting engine power to the front axle shaft, it has occurred to us that the use of a somewhat heavier duty engine and right-angle drive may greatly extend the flexibility of the conventional self-propelled rotary lawn mower so that a more universally useful machine can be obtained.

SUMMARY OF THE INVENTION

In accordance with the principles of our invention, in one illustrative embodiment thereof, a motor driven rotary mower may be provided with an auxiliary right-angle drive for selectively coupling engine power to a swingmounted tine-bearing shaft as well as to the front wheels. As the mower is forwardly propelled, the rotary blade cuts the usual swath of grass but in front thereof the powerdriven tines aerate the lawn thatch. The mechanical finger or tines extend below the plane of the rotary blade and cut through and lift the thatch allowing air and sunlight to reach through the lawn mat. The tines thus operate in a perpendicular plane to that of the rotating grass cutting blade.

It is an aspect of the operation of this embodiment of our invention that the loosened thatch is sucked into the vortex of the air current generated by the higher speed rotation of the rearwardly mounted grass-cutting blade. The thatch is then carried through the wind tunnel of the mower body and discharged into the catcher or grassbag advantageously mounted between the drive handles.

The tine-bearing shaft is swing-mounted so that the degree of engagement of the tips of the tines with the grass thatch of the lawn may be regulated. For this purpose, a bell-crank linkage is provided to a control lever on the drive handle. Advantageously, the engagement adjustment of the swing-mounted aerator shaft is wholly independent of the drive and idler wheel height adjustment which is provided for regulating grass cutting height. Accordingly, it is possible with the use of our present invention to do a certain amount of grass cutting at the same time as thatching.

Further in accordance with an aspect of our illustrative embodiment, a seed drill hopper may be mounted rearwardly of the rear idler wheels on the mower body to take maximum advantage of the slight scarifying of the soil incident to the thatching operation. The increased accessibility to the soil surface made possible by the thatching operation being performed at the front of the mower enables the seed drill to perform reseeding incident to the thatching operation. The increased proximity to or actual contact with the exposed ground of the drill spouts of the seed drill hopper also reduces the seed-scattering effect of the peripheral air turbulence from the rotary mower blade. Accordingly, a truly three-in-one machine operations of thatching, sweeping, and seeding or the four-in-one operations of thatching, cutting, sweeping, and seeding is now made possible.

BRIEF DESCRIPTION OF THE DRAWING

The foregoing and other objects and features of our invention may become more apparent by referring now to the drawing in which:

FIG. 2 shows a side view of the embodiment of FIG. 1;

FIG. 2A shows the details of the bell crank assembly;

GENERAL DESCRIPTION

Figure 1:
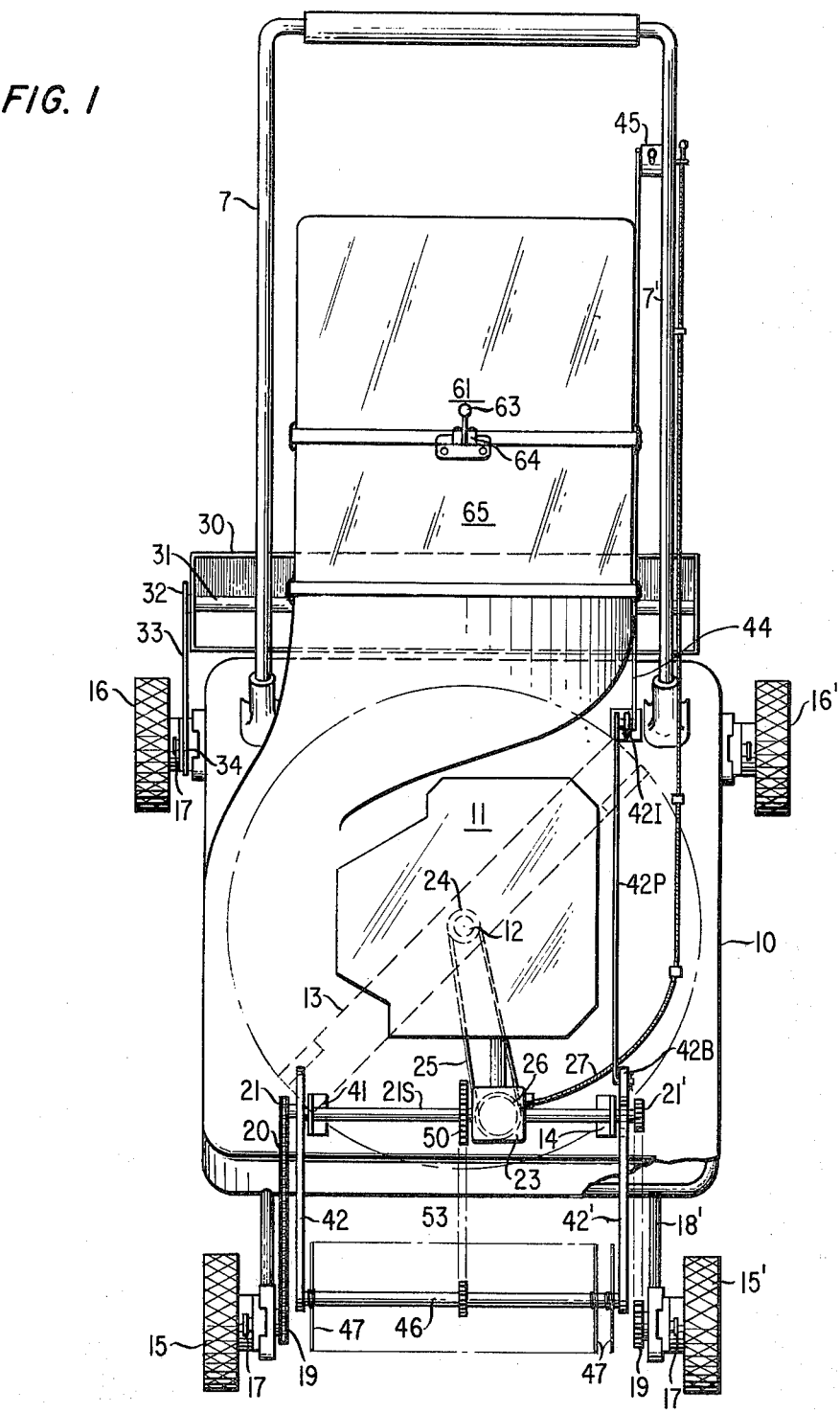
FIG. 1 shows a top view of an illustrative embodiment of our invention.

Referring now to FIG. 1 a base plate 10 serves as a driveable mounting platform for a gasoline engine 11, the vertical shaft 12 of which, extending below plate 10, drives cutting blade 13. Platform 10 is carried by drive wheels 15, 15' at its forward extremity and by idler wheels 16, 16' at its after portion. Both sets of wheels may be equipped with conventional height adjustments 17 which in the well-known manner may include spring-loaded detents (not explicitly shown) for setting the grass cutting height by regulating the height of platform 10 and hence of blade 13 with respect to the ground on which the wheels 15, 15'–16, 16' roll. The front drive wheels 15, 15' are advantageously positioned forward and clear of the main platform 10 by means of sponsons or forwardly projecting arms 18, 18'.

Drive wheels 15, 15' are shown equipped with a pair of spur gears 19, 19' mounted on the inward end of the axles of each of the wheels. Gears 19, 19' are linked by respective chains 20, 20' to driving gears 21, 21'. The driving gears 21, 21' are provided with engine power by means of right-angle drive 23.

Right angle drive 23 is equipped with a clutch mechanism that can be activated by means of control rod 27 selectively to engage and disengage engine power with drive sprocket 21'. Drive 23 is shown coupled to driving pulley 24 on engine shaft 12 by means of a V-belt 25 and driven pulley 26. Equally advantageously, the right-angle drive 23 may be coupled to motor shaft 12 by means of a conventional, beveled-gear drive. It should also be apparent that in lieu of chains 20, 20' and spur gears 19, an internal tooth gear drive may be employed as shown, for example, in U.S. Pat. No. 3,802,170, particularly FIG. 6 thereof.

Positioned rearwardly of platform 10 is a seed hopper 30 having an agitator shaft 31 and drive pulley 32 linked by belt 33 to a corresponding pulley 34 on idler wheel 16. Seed drill hopper 30 may be filled with seed and is designed to cooperate with the slight scarifying effect produced on the soil surface by the tine blades. The reseeding of the lawn simultaneously with the aerating being performed by the rotating tines is thereby facilitated.

Figure 4:
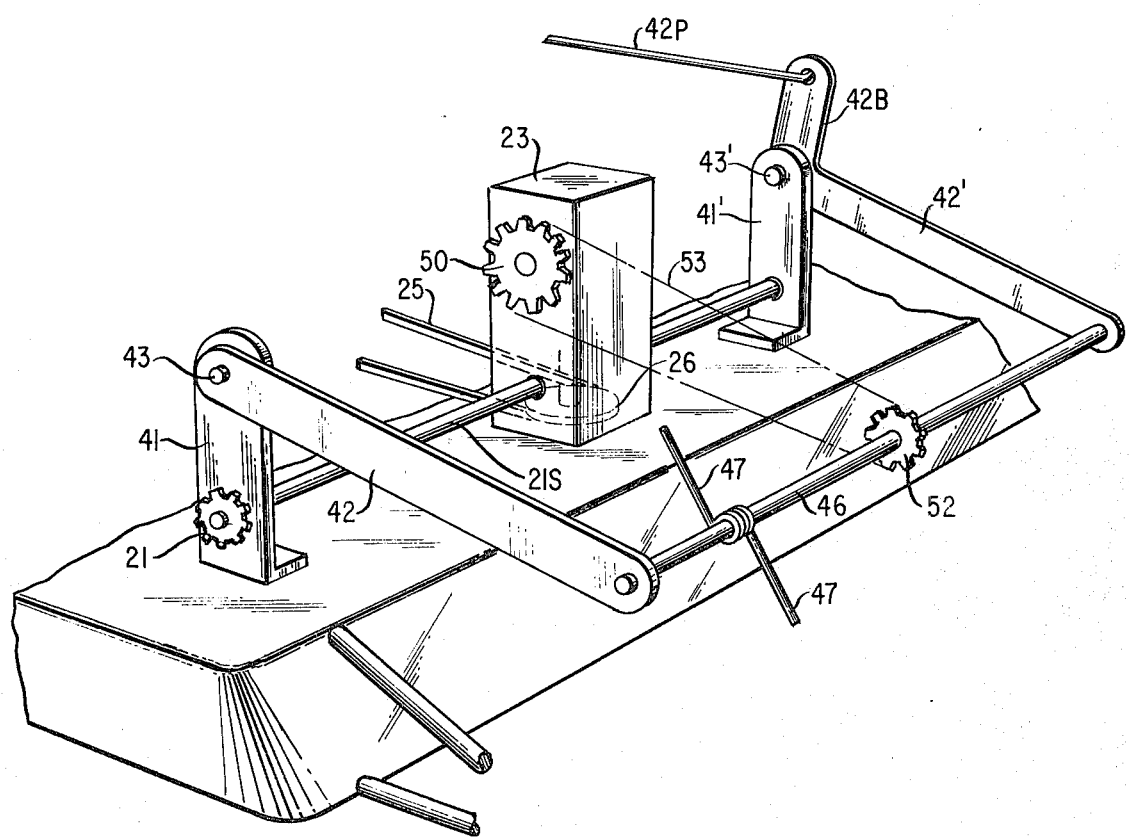
FIG. 4 shows the details of the swing arms, bell-crank and drive gear for the tine-bearing shaft of our invention

Mounted between wheels 15, 15' and outboard of right angle drive 23 on platform 10 are support pillars 41, 41' shown in detail in FIG. 4. Support pillars 41, 41' act as pillows blocks for power shaft 21S which transmits power to spur gears 21, 21'. Pinnions 43, 43' at the upper portion of each of support pillars 41, 41' rotatably support swing arms 42, 42'.

Swing arm 42' includes a bell-crank member 42B which is linked via parallelogram shaft 42P to a mating idler bell crank 42I, shown more clearly in FIG. 2, at the rear portion of platform 10 adjacent to drive handle 7'. Arm 42I' on this bell crank is linked by a control rod 44 to a detentable bell-crank assembly 45 mounted at the upper extremity of drive handle 7'.

Swing arm 42, 42' support tine-bearing shaft 46 on which are mounted a plurality of spring wire tines 47. The tines 47 have a length perpendicular to the axis of shaft 46 such that when arms 42, 42' are lowered by bell-crank mechanism 42-, 44, 45 to the lowermost extremity, the tips of tines 47 will assert a slight scarifying action on the surface of the ground beneath the wheels 15, 15'. Power is transmitted to shaft 46 by means of drive sprocket 50 at the upper portion of right angle drive 23. Drive sprocket 50 is coupled to drive sprocket 52 centrally mounted on shaft 46 by means of driving chain 53.

Right-angle drive 23 is thus seen to contain two rotational outputs, one associated with drive gear 50 and one associated with shaft 21S. The angular rotational speed of shaft 21S and drive gear 50 may be the same since pinnion 52 will have fewer teeth than pinnion 50 thereby causing shaft 46 to rotate at a higher rpm than shaft 21S. Alternatively, gear 50 may be driven by right-angle drive 23 at a somewhat higher rpm than shaft 21S to assure an even greater rotational speed to the tine-bearing shaft 46. The height of shaft 46 above the ground is regulated by bell-crank arm 42B via parallelogram link 42P to idler arm 42I (FIG. 2) and from thence via intermediate rod linkage 44 to detentable bell-crank assembly 45 mounted on control handle 7'. The detentable control handle assembly 45 includes a control knob 45-1 which may be manipulated by the operator when spring loaded detent 45-2 is retracted from the notched disc 45-3. There will be at least two notches in disk 45-3 one for the fully retracted position of arms 42, 42' and one for the full down position of these arms in which the arc of rotation of tines 47 will just graze the surface of the soil. Other intermediate positions of arms 42, 42' may be provided for by means of additional notches on disc 45-3.

As has been heretofore explained, the thatch loosened by the rotating tines 47 will be swept by the rotational vortex of high speed blade 13 into the ejection chute 60 and carried into grass catcher 61 which advantageously may be hung between drive handles 7, 7'. As a safety precaution, ejection chute 60 may be equipped with a steel door 62 so that bag 61 may not be removed from ejection chute 60 while door 62 is open. A release handle 63 is part of the hinge for door 62 and includes a finger 64 that rotates downwardly to lock into chute extension 65 when handle 63 is rotated backwardly to open door 62. Thus, when door 62 is in the open position allowing grass cuttings to be ejected through chute 60 and chute extension 65 into grass catcher 61, finger 64 prevents chute extension 65 and the bag 61 from being removed.

Figure 3:
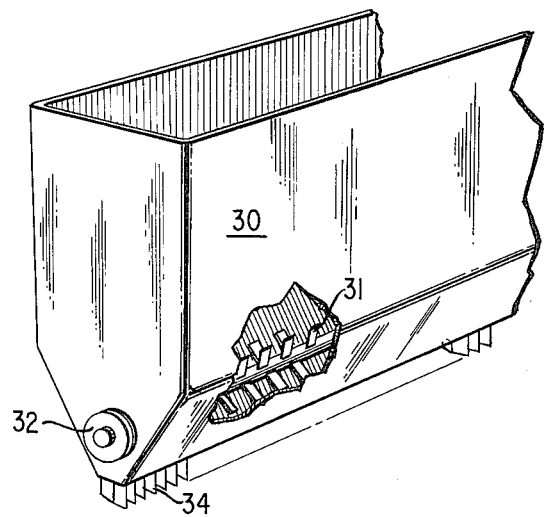
FIG. 3 shows the details of the seed drill hopper that is shown rearwardly mounted on the mower of FIGS. 1 and 2.

Referring to FIG. 2 the seed drill hopper 30 is shown mounted on the rear deck portion of platform 10 via an L bracket 36 and adjusting wing nut 35. Wing nut 35 is adjusted so that the height of the seed drill projections 34 is just at the surface of the earth. Advantageously, the seed drill extensions 34, shown also in FIG. 3, may track behind the tines 47 on shaft 46 so that the seed drills empty their contents along the scarifications in the soil producted by tines 47. In FIG. 1 a single control cable 27 is shown for engaging and disengaging right-angle drive 23 from motor power. It will be apparent that two independent right-angle drives each with its own control cable 27 may be provided, one for shaft 21S for the front drive wheels 15, 15' and one for drive pinnion 50 for the tine-bearing shaft 46.

Further and other modifications will be apparent to those of skill in the art without however departing from the spirit and scope of our invention.

What is claimed is:

1. A rotary power driven lawn mower comprising a base plate, a pair of front driving wheels and a pair of rear idler wheels attached to said base plate, an engine mounted above said base plate, rotary blade means positioned below said base plate and coupled to be driven to said engine, power drive means coupling said front drive wheels to said engine, a pair of swing arms hingeably mounted to said base plate, a tine-bearing shaft rotatably journalled in said swing arms extending between said front driving wheels, and means for engageably coupling said tine-bearing shaft to said engine.

2. A rotary power driven lawn mower according to claim 1 further comprising means coupled to said swing arms independently of said driving and said idler wheels for adjustably raising and lowering said shaft to selectively extend the arc of said tines above or below the plane of said rotary blade.

3. A rotary power driven lawn mower according to claim 1 further comprising a seed drill hopper attached to the rear portion of said base plate, the seed drills of said hopper extending below the plane of said rotary blade and in registration with the tines of said tine-bearing shaft thereby to discharge seed into the scarifications produced in the ground by said tines of said power-driven tine-bearing shaft.

4. A lawn mower according to claim 3 wherein said means for engageably coupling tine-bearing shaft to said engine includes right-angle gear drive means for driving said shaft at a lower rotational speed than that of said rotary grass cutting blade.

5. A lawn mower according to claim 3 further comprising height adjusting means at each of said wheels and wherein said means for raising and lowering said tine-bearing shaft includes a bell crank mounted on said base plate for regulating the horizontal height of said tine-bearing shaft above said ground independently of said height adjusting means at each of said wheels.

* * * * *